Figure 1:
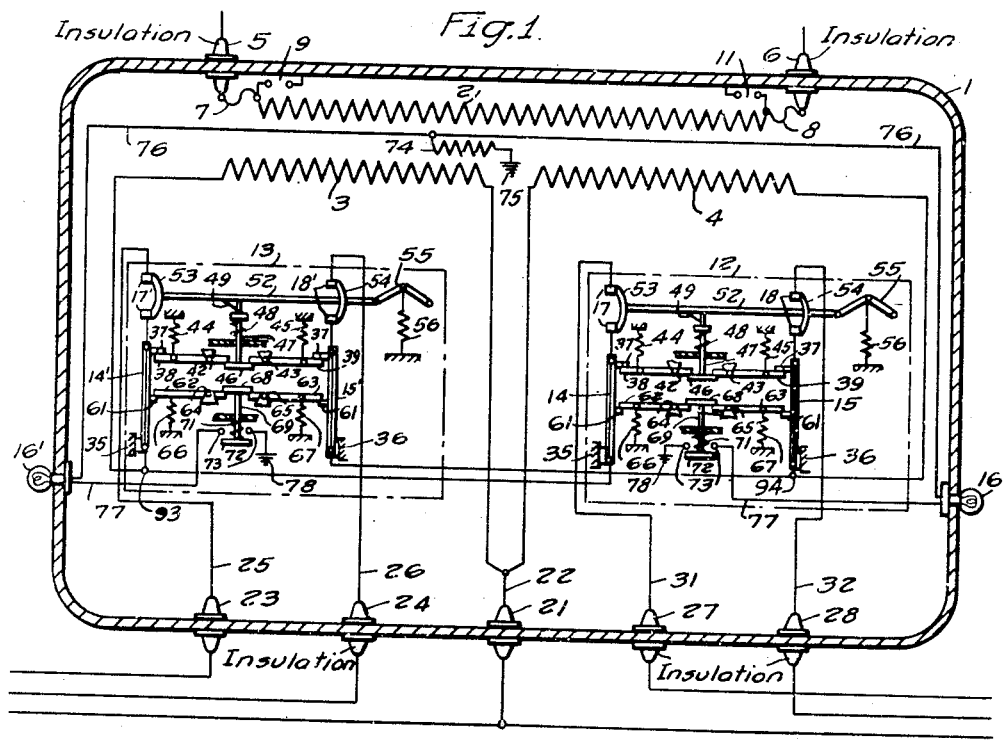

July 12, 1949.  J. K. HODNETTE  2,476,147
DISTRIBUTION TRANSFORMER FOR BANKING SERVICE
Filed Feb. 20, 1946

WITNESSES:
E. Q. McCloskey

INVENTOR
John K. Hodnette.
BY
Franklin E. Hardy
ATTORNEY

Patented July 12, 1949

2,476,147

UNITED STATES PATENT OFFICE 2,476,147

DISTRIBUTION TRANSFORMER FOR BANKING SERVICE

John K. Hodnette, Sharon, Pa., assignor to Westinghouse Electric Corporation, East Pittsburgh, Pa., a corporation of Pennsylvania Application February 20, 1946, Serial No. 649,073

8 Claims. (Cl. 175—294)

My invention relates to distribution transformers and, more particularly, to such transformers arranged for banking service.

Secondary network systems of electrical distribution were developed some time ago in order to improve the reliability of service and provide a good voltage regulation in heavy density load areas. In such a system, a network of interconnected secondary circuits is supplied with electric energy from a plurality of feeder circuits each connected to the secondary network circuits through a plurality of transformers provided with network protectors. The network protector is controlled to disconnect the transformer secondary winding from the network circuit upon the reversal of power flow through the transformer which may be caused by a fault on the associated feeder, thus disconnecting the faulty feeder circuit from the network circuit. The network circuit then continues to receive energy from the remaining feeder circuits through the transformers connected to those circuits without interrupting the service supplied from the network circuit.

In many places where networks can not be justified due to the expense involved, a better class of service is required than can be obtained from ordinary radial systems such as the banking or interconnecting of the secondaries of transformers together to supply energy to the low voltage distribution circuit through a plurality of distribution transformers connected in parallel.

In my prior Patent 2,340,057 for Distribution transformers for banking service, issued January 25, 1944 and assigned to the same assignee as this application, a transformer for banking service is disclosed and claimed that is provided for connection between a high voltage feeder circuit and two or more low voltage distribution circuit portions, the transformer secondary being connected to one of the circuit portions through one circuit breaker only and to another of the circuit portions through two circuit breakers, the breakers being adjusted to operate in a predetermined sequence so that the first to trip segregates one circuit portion from the transformer without interrupting the supply of energy to the other circuit portion.

It has been proposed to provide a transformer for banking service having three breakers, one for controlling the flow of current through one branch circuit, another for controlling the flow of current through the other branch circuit and the third for controlling the total current flow from the transformer secondary winding. Such an arrangement would have the advantage of disconnecting either branch circuit supplied with current from the secondary winding without operation of the transformer breaker to disconnect the entire transformer load from the distribution circuit. Obviously, it is undesirable to disconnect the transformer from the distribution circuit when only one of the two distribution circuit portions supplied from the transformer is faulty, since the loss of a transformer if the bank of transformers is heavily loaded may result in overloading the remaining transformers and cascading the transformer breakers of the bank from this cause. On the other hand, the use of three breakers in the transformer is undesirable because of its increased cost.

It is an object of my invention to provide a transformer for banking service for connection between a high voltage feeder circuit and two or more low voltage distribution circuit portions, the transformer secondary winding being connected to the plurality of circuit portions through separate circuit breakers so that the supply of load current to each distribution circuit portion may continue upon interruption of the supply of current to another distribution circuit portion. In accordance with the invention, the means for disconnecting any distribution circuit portion from the transformer secondary winding operates independently of the means for disconnecting any other distribution circuit portion from the transformer secondary winding.

Figure 2:
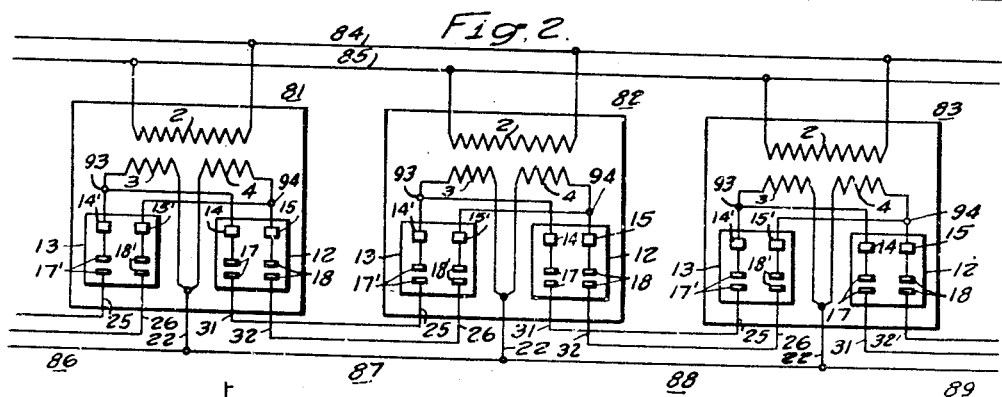
Figure 3:
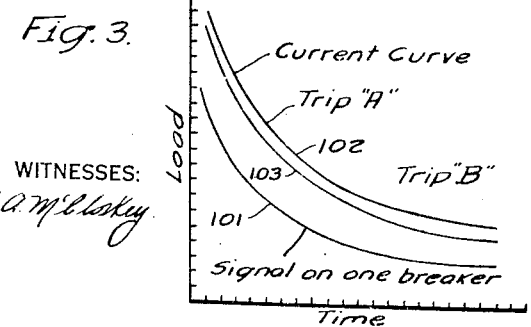

Other objects and advantages of the invention will be apparent from the following description of the invention, reference being had to the accompanying drawing, in which:

Figure 1 is a diagrammatic view of circuits and apparatus comprising a transformer unit organized in accordance with the invention, Fig. 2 is a diagrammatic view of circuits illustrating the application of a group or bank of such transformers in a distribution circuit, and Fig. 3 is a view showing curves illustrating the operating characteristics of certain parts of the mechanism.

Referring to the drawing and particularly to Fig. 1 thereof, the transformer disclosed consists of a tank 1 enclosing a primary winding 2 and a secondary winding shown as having two portions 3 and 4. The primary winding is connected through bushings 5 and 6 to a source of electrical energy through circuit conductors including protective links 7 and 8 which are provided to disconnect the transformer from the high voltage circuit in case of a fault in the transformer itself. Arc discharge devices 9 and 11 are provided between the terminals of the primary winding 2 and the tank and are here illustrated diagrammatically as simple gaps, but it will be understood that they may comprise other conventional discharge gap devices, such as those disclosed in my Patent 2,066,935, issued January 5, 1939. Mounted within the casing 1 are two circuit breakers indicated by the rectangles 12 and 13 shown in dot and dash lines.

The circuit breaker 12 is connected to provide thermal protection to the transformer windings by interrupting the current connection between the transformer secondary winding and one of the portions of the distribution circuit. The circuit breaker 13 is connected to provide thermal protection to the transformer windings by interrupting the circuit connection between the transformer secondary winding and another portion of the distribution circuit.

The two circuit breakers are essentially alike, each being subject to the control of thermal elements 14 and 15 and 14' and 15' connected in parallel in two separate circuits leading from the secondary transformer winding.

Each of the thermal elements is connected for tripping a plurality of latches, one of which controls a temperature indicating signalling device shown as lamps 16 and 16' to indicate overload on the transformer, and the other of which subsequently operates the associated breaker contact members 17 and 18 or 17' and 18' of the two breakers 12 and 13, respectively. It will be noted that five secondary bushings are employed. The bushing 21 accommodates the neutral line conductor 22 that is connected to the joined ends of the two secondary windings 3 and 4 and which is connected to the neutral of the distribution system which is usually grounded. The bushings 23 and 24 accommodate conductors 25 and 26, respectively, extending to the left from the transformer and comprising distribution section circuit conductors that are controlled by the circuit breaker 13. The bushings 27 and 28 accommodate conductors 31 and 32 extending to the right from the transformer and comprising distribution section circuit conductors from the transformer.

Referring to Fig. 1, the remaining parts of the circuit breakers will be described in further detail, the description being directed particularly to the breaker 12, the breaker 13 being shown for the purpose of illustration as identical in construction to the breaker 12 and the corresponding parts being indicated by the same numerals as in the breaker 12 except that, in certain cases, the numerals are primed. It is not essential in practice that the breakers be identical in construction or that the actuating means be the same for both breakers. The bimetal elements 14 and 15 which are positioned in the transformer casing below the level of the cooling and insulating level constitute thermally actuated load responsive elements for initiating the operation of the circuit breaker 12 to disconnect the transformer secondary winding from the distribution circuit conductors extending to the right from the transformer. The bimetal elements 14' and 15' similarly operate for initiating the operation of the circuit breaker 13 to disconnect the transformer secondary winding from the circuit conductors leading to the left from the transformer.

The bimetal elements 14 and 15 are mounted on suitable abutments 35 and 36, respectively, and are provided with latches 37 carried by the outer or moving ends that are adapted to disengage tripping members 38 and 39 that are pivotally mounted on pins 42 and 43, respectively, and biased by springs 44 and 45. The ends of the tripping members 38 and 39 remote from the latches 37 are positioned adjacent to an operating member 46 attached to a latch rod 47 that is normally biased by the spring 48 to its illustrated position to engage a projection 49 carried by a switch operating member 52 for maintaining the switch operating contact members 53 and 54 in circuit closing positions. Upon disengagement of the rod 47 from the projection 49, the circuit interrupting contact members 53 and 54 are actuated by the rod 52 and the toggle mechanism 55 by the compression spring 56. This may be brought about by heating either of the bimetal thermal elements 14 or 15 sufficiently to release its associated latch 37 from engagement with the associated tripping members 38 or 39 so that, should the output current through either of the conductors 31 and 32 increase above the desired value for which the equipment is set to operate, the circuit breaker 12 will be tripped.

For the purpose of controlling the energization of the signal light 16, additional tripping means is provided which may also be operated by the latches 37 but which, for the purposes of clearer illustration, are here indicated as being tripped by separate latches 61 which are so arranged as to be adapted to engage tripping members 62 and 63. The tripping members 62 and 63 are pivotally mounted on pivot pins 64 and 65, respectively, and are biased by the springs 66 and 67. The ends of the tripping members 62 and 63 that are remote from the latches 61 are positioned adjacent to an operating member 68 attached to a switch operating rod 69 normally biased by a spring 71 to its illustrated position to hold the switch contact member 72 in a circuit interrupting position. Upon disengagement of the latch 61 associated with either the bimetal 14 or the bimetal 15 of the circuit breaker 12, the operating member 68 will be moved to cause the switch contact member 72 to close a circuit through contact member 73, thus energizing the lamp 16 through a circuit receiving energy from a winding 74, shown as inductively related to the primary winding 2 and having one terminal ground at 75. This circuit extends through conductor 76 to the lamp 16, conductor 77, the switch contact members 73 and 72 to ground at 78. Upon a similar operation of the bimetal 14' or the bimetal 15' a similar circuit is closed including the lamp 16'. The corresponding parts of the two lamp circuits are similarly numbered.

The circuit breaker devices 12 and 13 and the control mechanism, therefore, that is actuated in response to the bimetal elements 14 and 15 may correspond to the circuit breaker disclosed in United States Patent No. 2,169,586, issued to M. G. Leonard, August 15, 1939, and assigned to the same assignee as this invention. Such a circuit breaker is mounted to operate under the oil in which the transformer is immersed so that the bimetal elements 14 and 15 are responsive to the temperature of the transformer oil and also to the current flowing in the secondary circuit.

As indicated in curve 101, in Fig. 3, the circuit breaker devices may be so adjusted that the signal device 16 will be energized by closing the circuit through the contact member 73 prior to the heating of the bimetal elements sufficiently to trip the breaker and interrupt the circuit through the contact members 17 and 18. The signal light is thereby used both to indicate overload and also operation of the breaker to disconnect the circuit from the system. The thermal elements controlling the circuit breakers 12 and 13 may be adjusted to operate along selected time-load current values as shown by the curves 102 and 103 in Fig. 3.

Referring to Fig. 2, a bank of transformers 81, 82 and 83 are illustrated having primary windings connected to feeder circuit conductors 84 and 85 and having secondary windings connected to distribution circuit conductor sections 86, 87, 88 and 89. It will be noted that the circuit conductors comprising sections 87 and 88 are each connected to two adjacent transformers in the group or bank. The extreme end sections 86 and 89 may be dead-end sections supplied from a single transformer. Whenever possible, it is preferable to connect the two ends of the distribution circuit together to form a closed loop in which case the several transformers will all be similarly connected to supply two circuit portions, there being no end sections.

It will be noted that the thermally responsive bimetal elements 14 and 15 that control the circuit breaker 12 are responsive only to the current flowing from the secondary winding of the transformer to the distribution circuit extending from the right of the transformer while the thermally responsive bimetal elements 14' and 15', which control the operation of the circuit breaker 13, are responsive only to the current flowing in the distribution circuit portion extending to the left of the transformer. The current flowing from the secondary winding of the transformer to the junction points 93 and 94 divides at these junction points so that the separate circuit breakers 12 and 13 in each transformer are controlled jointly by the transformer oil temperature and also by the current flowing only in the distribution circuit portion that is controlled by the particular circuit breakers 12 or 13.

By paralleling the breakers in the transformers through a nominal impedance in the transformer circuit and by properly adjusting the temperature at which the various thermal elements will trip the breakers controlled by them, selective operation of the breakers may be assured to prevent the transformer windings from being damaged by overheating either with a balanced or unbalanced load flowing from the two circuits supplied by each transformer. In case of a fault between two transformers, such as in the distribution circuit portion 88, fault current will flow from both the transformer 82 and the transformer 83 and also from the next adjacent sections of the distribution circuit, such as the section 87. The major portion of the current that flows to the fault will, however, flow from the transformers directly connected to the faulted section, rather than from the adjacent sections of the distribution circuit. Current flowing from section 87, for example, into faulted section 88 will flow upwardly in the diagram of Fig. 2 through the circuit breaker 13 of the transformer 82, or in a direction contrary to the flow of current from the transformer windings of the transformer 82 so that the resulting current through the circuit 13 will be less than normal while this current will add to the current flowing through the circuit breaker 12 so that the current through the circuit breaker 12 will be greater than normal, thus causing selective operation of the breaker 12 of the transformer. The fault current drawn from the section 87 to the fault in the section 88 is much less than that from the transformer 82.

Thus a fault in the section 88 will result in operation of the circuit breaker 12 of the transformer 82 and the circuit breaker 13 of the transformer 83 through which current is supplied to the section 88, thus isolating this section from the remaining sections or portions of the distribution circuit.

By properly adjusting the tripping points of the two circuit breakers of each transformer, a transformer can supply a large portion of its original capacity, without tripping the remaining breaker and disconnecting the transformer from the load. This will result in a much more satisfactory operation than where the entire transformer load is interrupted as the result of a fault in one of the adjacent distribution circuit portions supplied therefrom, since when the entire transformer load is interrupted this necessarily places a larger burden on at least one other transformer of the bank in order to maintain service in the unfaulted sections of the distribution circuit adjacent the faulted section.

It will be apparent to those skilled in the art that modifications in the circuit and arrangements of parts may be made within the spirit of my invention and I do not wish to be limited otherwise than by the scope of the appended claims.

I claim as my invention:

1. In combination, an electrical transformer comprising a casing, a primary winding and a secondary winding within the casing, circuit conductors leading from said secondary winding to junction points within the casing, two pairs of secondary circuit conductors leading from said junction points and extending through the casing to separate distribution circuit sections exterior to the transformer casing, two separate section circuit breakers within the casing associated, respectively, with said two pairs of secondary circuit conductors, the one circuit breaker arranged for disconnecting one pair of secondary circuit conductors only from said junction points, and the other circuit breaker being arranged for disconnecting the other of said two pairs of secondary circuit conductors only from said junction points, means responsive to the current flowing in either of the conductors of one pair of conductors for operating the section circuit breaker controlling the flow of current from said junction points through one pair of secondary circuit conductors to the section of the distribution circuit that is controlled by said section circuit breaker, and means responsive to the current flowing in either of the conductors of the other pair of secondary circuit conductors for operating the section circuit breaker controlling the flow of current from said junction points to the section of the distribution circuit controlled by said other section circuit breaker.

2. In combination, an electrical transformer comprising a casing, a primary and a secondary winding within the casing, a first section circuit including two conductors leading from said secondary winding, and a second section circuit including two conductors leading from said secondary winding, a section circuit breaker within said casing for disconnecting said first section circuit from said secondary winding, a second section circuit breaker within said casing for disconnecting said second section circuit from said secondary winding, means responsive to a condition of the transformer comprising thermal means responsive to the current in each of the said two conductors of said first section circuit leading from said secondary winding for operating the first-named section circuit breaker upon a certain predetermined intensity of said condition of the transformer, and means responsive to a condition of the transformer comprising thermal means responsive to the current in each of the said two conductors of said second section circuit leading from said secondary winding for operating the second-named section circuit breaker upon a certain predetermined intensity of said condition of the transformer.

3. In combination, an electrical transformer comprising a casing, a liquid dielectric therein, a primary and a secondary winding within the casing immersed in said liquid dielectric, a first section circuit comprising a plurality of conductors leading from said secondary winding, and a second section circuit comprising a plurality of conductors leading from said secondary winding, a multiple section circuit breaker within said casing for disconnecting said first section conductors from said secondary winding, a multipole section circuit breaker within said casing for disconnecting said second section conductors from said secondary winding, means responsive to a condition of the transformer comprising thermal means immersed in said liquid dielectric and responsive both to the temperature of said dielectric and to the current flowing in each of the said plurality of conductors of said first section circuit leading from said secondary winding for operating said first-named section circuit breaker upon a predetermined intensity of said condition of the transformer, and means responsive to said condition of the transformer comprising thermal means responsive both to the temperature of said liquid dielectric and the current in each of the said plurality of conductors of said second section circuit leading from said secondary winding for operating said second-named section circuit breaker upon a predetermined intensity of said condition of the transformer.

4. In combination, an electrical transformer comprising a casing, a primary and a secondary winding within the casing, a first section circuit comprising a plurality of conductors leading from said secondary winding, and a second section circuit comprising a plurality of conductors leading from said secondary winding, a multipole section circuit breaker within said casing for disconnecting said first section circuit from said secondary winding, a second multipole section circuit breaker within said casing for disconnecting said second section circuit from said secondary winding, means responsive to a condition of the transformer comprising separate thermal means responsive to the current flowing in the respective conductors of said first section circuit for operating said first-named multipole section circuit breaker upon a predetermined intensity of said condition of the transformer, and means responsive to said condition of the transformer comprising separate thermal means responsive to the current flowing in the respective conductors of said second section circuit for operating said second-named multipole section circuit breaker upon a predetermined intensity of said condition of the transformer.

5. In combination, an electrical transformer comprising a casing, a primary winding and a secondary winding within the casing, a pair of circuit conductors leading from said secondary winding to junction points, a plurality of separate pairs of secondary circuit conductors leading from said junction points and extending through the casing to separate secondary distribution circuit sections exterior to the transformer casing, a plurality of separate section circuit breakers within the casing, the several circuit breakers being associated, respectively, with said several pairs of separate pairs of secondary circuit conductors, each one of said circuit breakers being arranged for disconnecting one only of said pairs of secondary circuit conductors from said junction points, means responsive to the current flowing in either of the conductors of one pair of conductors for operating the section circuit breaker only that controls the flow of current from said junction points through the pair of secondary circuit conductors to the section of the distribution circuit that is controlled by said section circuit breaker, and means responsive to the current flowing in either of the conductors of any of the other pairs of secondary circuit conductors for operating the section circuit breaker controlling the flow of current from said junction points to the section of the distribution circuit controlled by that section circuit breaker.

6. In combination, an electrical transformer comprising a casing, a primary and a secondary winding within the casing, a first section circuit including two conductors leading from said secondary winding, and a second section circuit including two conductors leading from said secondary winding, a section circuit breaker within said casing for disconnecting said first section circuit from said secondary winding, a second section circuit breaker within said casing for disconnecting said second section circuit from said secondary winding, means associated with each of said circuit breakers responsive to a condition of the transformer comprising two separate thermal means each responsive to the temperature of the transformer and also responsive, respectively, to the current in the said two conductors of said first section circuit leading from said secondary winding for operating the first-named section circuit breaker upon a certain predetermined intensity of said condition of the transformer, and means responsive to a condition of the transformer comprising two separate thermal means each responsive to the temperature of the transformer and also responsive, respectively, to the current in the said two conductors of said second section circuit leading from said secondary winding for operating the second-named section circuit breaker upon a certain predetermined intensity of said condition of the transformer.

7. In combination, an electrical transformer comprising a casing, a liquid dielectric therein, a primary and a secondary winding within the casing immersed in said liquid dielectric, a first section circuit comprising a plurality of conductors leading from said secondary winding, and a second section circuit comprising a plurality of conductors leading from said secondary winding, a multipole section circuit breaker within said casing for disconnecting said first section conductors from said secondary winding, a multipole section circuit breaker within said casing for disconnecting said second section conductors from said secondary winding, means responsive to a condition of the transformer comprising thermal means immersed in said liquid dielectric and responsive both to the temperature of said dielectric and to the current flowing in each of the said plurality of conductors of said first section circuit leading from said secondary winding for operating said first-named section circuit breaker upon one predetermined intensity of said condition of the transformer, and means responsive to said condition of the transformer comprising thermal means responsive both to the temperature of said liquid dielectric and to the current in each of the said plurality of conductors of said second section circuit leading from said secondary winding for operating said second-named section circuit breaker upon a different predetermined intensity of said condition of the transformer, each of the said several thermal means being adjusted to operate at a value of the said condition of the transformer substantially above normal half-load on the transformer and substantially below normal full load on the transformer.

8. In combination, an electrical transformer comprising a casing, a primary and a secondary winding within the casing, a first section circuit comprising a plurality of conductors leading from said secondary winding, and a second section circuit comprising a plurality of conductors leading from said secondary windings, a multipole section circuit breaker within said casing for disconnecting said first section circuit from said secondary winding, a second multipole section circuit breaker within said casing for disconnecting said second section circuit from said secondary winding, means responsive to a condition of the transformer comprising separate thermal means responsive to the current flowing in the respective conductors of said first section circuit for operating said first-named multipole section circuit breaker upon a predetermined intensity of said condition of the transformer, and means responsive to said condition of the transformer comprising separate thermal means responsive to the current flowing in the respective conductors of said second section circuit for operating said second-named multipole section circuit breaker upon a predetermined intensity of said condition of the transformer, the several thermal means being individually adjustable for operating their associated multipole section circuit breakers upon different predetermined intensities of said condition of the transformer.

JOHN K. HODNETTE.

REFERENCES CITED

The following references are of record in the file of this patent:

UNITED STATES PATENTS

| Number | Name | Date |
| --- | --- | --- |
| 959,787 | Nicholson | May 31, 1910 |
| 1,155,134 | Conrad | Sept. 28, 1915 |
| 1,893,356 | Blake | Jan. 3, 1933 |
| 2,298,229 | Putman et al. | Oct. 6, 1942 |
| 2,337,829 | Lockie | Dec. 28, 1943 |
| 2,340,057 | Hodnette | Jan. 25, 1944 |